United States Patent
Wu et al.

(10) Patent No.: US 9,954,885 B2
(45) Date of Patent: Apr. 24, 2018

(54) SOFTWARE/HARDWARE DEVICE WITH UNCERTAIN SERVICE FUNCTION AND STRUCTURAL CHARACTERIZATION, AND SCHEDULING METHOD THEREOF

(71) Applicants: Shanghai RedNeurons Co., Ltd., Shanghai (CN); China National Digital Switching System Engineering & Technological R&D Center, Zhengzhou, Henan Province (CN)

(72) Inventors: Jiangxing Wu, Zhengzhou (CN); Yuxiang Hu, Zhengzhou (CN); Fan Zhang, Zhengzhou (CN); Qinrang Liu, Zhengzhou (CN); Julong Lan, Zhengzhou (CN); Zhiming Wang, Zhengzhou (CN); Junfei Li, Zhengzhou (CN); Jianhui Zhang, Zhengzhou (CN); Yufeng Li, Zhengzhou (CN); Ke Song, Zhengzhou (CN); Xingming Zhang, Zhengzhou (CN); Shuai Wei, Zhengzhou (CN)

(73) Assignees: Shanghai RedNeurons Co., Ltd., Shanghai (CN); China National Digital Switching System Engineering & Technological R&D Center, Zhengzhou (CN)

( * ) Notice: Subject to any disclaimer, the term of this patent is extended or adjusted under 35 U.S.C. 154(b) by 289 days.

(21) Appl. No.: 15/018,559

(22) Filed: Feb. 8, 2016

(65) Prior Publication Data
US 2016/0352770 A1    Dec. 1, 2016

(30) Foreign Application Priority Data

Jun. 1, 2015    (CN) .......................... 2015 1 0293341
Jun. 1, 2015    (CN) .......................... 2015 1 0293367
Jun. 1, 2015    (CN) .......................... 2015 1 0293417

(51) Int. Cl.
*H04L 29/06*    (2006.01)

(52) U.S. Cl.
CPC .............................. *H04L 63/1433* (2013.01)

(58) Field of Classification Search
CPC ................................................. H04L 63/1433
See application file for complete search history.

(56) References Cited

U.S. PATENT DOCUMENTS

8,028,293 B2 * 9/2011 Azar ..................... G06F 9/4881
                                                        709/226
9,417,997 B1 * 8/2016 DeSimone .............. G06F 12/02
(Continued)

*Primary Examiner* — Beemnet Dada
(74) *Attorney, Agent, or Firm* — Bret E. Field; Bozicevic, Field & Francis LLP (57) ABSTRACT

The present invention discloses a software/hardware device with uncertain service function and structural characterization and a method for scheduling the same. The device comprises a policy generator, a scheduler and a plurality of heterogeneous functional equivalents with equivalent functions, wherein the policy generator is configured for providing a scheduling policy for the heterogeneous functional equivalents to the scheduler; the scheduler is configured for receiving an external service request, determining heterogeneous functional equivalents that provide a service to the external service request according to the scheduling policy given by the policy generator, assigning the service request to the determined heterogeneous functional equivalents, and outputting a service response which has an uncertain relation with uncertain structural characterization according to a feedback and the scheduling policy given by the policy generator. Therefore, the service response provided to the service request has an uncertain correspondence relation with feedback results of the heterogeneous functional equivalents of the device, so that the effectiveness of detection or attack on an unknown loophole, trapdoor of the (Continued)

device is greatly lowered, and the protective ability of the software/hardware device is enhanced.

18 Claims, 5 Drawing Sheets

(56) References Cited

U.S. PATENT DOCUMENTS

| | | | | |
|---|---|---|---|---|
| 2003/0074467 A1* | 4/2003 | Oblak | .................. | H04L 67/1002 709/238 |
| 2009/0031312 A1* | 1/2009 | Mausolf | ................ | G06F 9/4881 718/102 |
| 2012/0278811 A1* | 11/2012 | Baynast | ................ | G06F 9/5027 718/104 |
| 2015/0271264 A1* | 9/2015 | Sun | .................... | H04L 41/0226 709/217 |
| 2016/0092274 A1* | 3/2016 | Singh | ................... | G06F 9/5027 718/104 |

* cited by examiner

SOFTWARE/HARDWARE DEVICE WITH UNCERTAIN SERVICE FUNCTION AND STRUCTURAL CHARACTERIZATION, AND SCHEDULING METHOD THEREOF

CROSS-REFERENCE TO RELATED APPLICATION

This application claims the benefit of CN Application No. 201510293367.1 filed on Jun. 1, 2015, titled "SOFTWARE/HARDWARE DEVICE WITH UNCERTAIN SERVICE FUNCTION AND STRUCTURAL CHARACTERIZATION", which is incorporated herein by reference in its entirety.

This application claims the benefit of CN Application No. 201510293341.7 filed on Jun. 1, 2015, titled "DEVICE AND METHOD FOR SCHEDULING A HETEROGENEOUS FUNCTIONAL EQUIVALENT", which is incorporated herein by reference in its entirety.

This application claims the benefit of CN Application No. 201510293417.6 filed on Jun. 1, 2015, titled "DEVICE AND METHOD FOR OUTPUTTING A SERVICE RESPONSE OF A HETEROGENEOUS FUNCTIONAL EQUIVALENT", which is incorporated herein by reference in its entirety.

FIELD OF THE INVENTION

The present invention relates to a field of network space security protection technologies, and in particular, to a software/hardware device with uncertain service function and structural characterization, and a method for scheduling the same.

BACKGROUND OF THE INVENTION

With the universal application of Internet technologies, a safe and stable network space environment is required more and more, thus network information security is of critical importance. However, various safety risks exist in the network environment. Such risks includes: loopholes existing on the hardware, software or system; backdoors created in the software by a programmer, through which the safety control can be bypassed to obtain an access right on the program or system; and trapdoors established for debugging and testing the program, which are "machineries" set in a certain system or a certain file and by which security policies are allowed to be violated when certain input data are provided. For example, a logon processing subsystem is allowed to process a certain user identification code so as to bypass ordinary password check. Moreover, such loopholes, backdoors and trapdoors are usually unavoidable in a network system.

The network space field includes various software/hardware devices with certain service functions. Such software/hardware devices may be systems, subsystems, components, modules, elements and even apparatuses, and the structural state of such software/hardware devices which is represented outward is referred to as structural characterization. Generally, for a software/hardware device with a given function, a certain mapping relation exists between its external structural form and its internal structural form, and such a mapping relation usually is static and determinate on the technical architecture of the network space field. At the same time, a design deficiency (loophole) or an embedded trapdoor (backdoor) based on this architecture has universality and stability at the systematic level, thus it tends to be utilized by an attacker. For example, based on such a determinate mapping relation, the attacker may detect or utilize a defect (loophole) or a trapdoor (backdoor) that exists or may exist on the internal structure of a device to attain an attack purpose. Once the attacker utilizes such an undetected defect (loophole) or an unknown trapdoor (backdoor), it will cause great asymmetry between the costs of the attacking party and the defending party on the network space, and it will be harmful to the network security environment.

In the prior art, a defensive measure for network space security is to accurately detect the safety of the network space field and take a corresponding measure; however, in such a defensive measure, measures will be taken only when an attack on the network is detected, and an unknown risk caused by the design deficiency (loophole) or the embedded trapdoor (backdoor) on the network space architecture cannot be coped with. As a result, such a defensive measure cannot defend against a network attack in advance.

SUMMARY OF THE INVENTION

The invention provides a software/hardware device with uncertain service function and structural characterization, and a method for scheduling the same. In order to solve the above technical problems, embodiments of the invention disclose the technical solutions below.

A software/hardware device with uncertain service function and structural characterization, comprising a policy generator, a scheduler and a plurality of heterogeneous functional equivalents with equivalent functions, the scheduler being set between the policy generator and the heterogeneous functional equivalents, wherein:

the policy generator is configured for providing a scheduling policy for the plurality of heterogeneous functional equivalents to the scheduler; and the scheduler is configured for receiving an external service request, determining heterogeneous functional equivalents that provide a service to the external service request according to the scheduling policy given by the policy generator, assigning the external service request to the determined heterogeneous functional equivalents, receiving a feedback from the determined heterogeneous functional equivalents, and outputting a service response which has an uncertain relation with uncertain structural characterization according to the feedback and the scheduling policy given by the policy generator.

Further, the determining heterogeneous functional equivalents that provide a service to the external service request comprises the following steps:

determining heterogeneous functional equivalents that are capable of providing a current service according to states of the plurality of heterogeneous functional equivalents; and determining heterogeneous functional equivalents that provide a service to the external service request among the heterogeneous functional equivalents that are capable of providing the current service, according to the scheduling policy given by the policy generator.

Further, the policy generator is a random policy generator or a dynamic policy generator.

Moreover, the device further includes: a parameter configurator, which is connected with the policy generator, and configured for providing a policy parameter to the policy generator so as to make the policy generator generate a scheduling policy corresponding to the policy parameter.

Moreover, the device further includes: a monitor, which is connected with the scheduler and the plurality of heterogeneous functional equivalents, and configured for monitoring working states of the scheduler and the plurality of heterogeneous functional equivalents and sending an alarm or an operational instruction according to a monitored situation.

Moreover, the device further includes: an input proxy, which is connected with the scheduler and the plurality of heterogeneous functional equivalents, and a first redundant controller, which is integrated into the scheduler, wherein:

the input proxy is configured for receiving an external service request, triggering the first redundant controller with the external service request, receiving information of the heterogeneous functional equivalents selected by the first redundant controller, and assigning the external service request to the selected heterogeneous functional equivalents; and the first redundant controller is configured for receiving the triggering signal given by the input proxy, receiving a first control parameter input externally, randomly selecting heterogeneous functional equivalents to provide a service to the external service request according to an indication of the first control parameter, and feeding selection information for the heterogeneous functional equivalents back to the input proxy.

Further, the first control parameter includes the number of heterogeneous functional equivalents that may be selected or a seed for generating a random number.

Moreover, the device further includes: an output proxy, which is connected with the scheduler and the plurality of heterogeneous functional equivalents, and a second redundant controller, which is integrated into the scheduler, wherein:

the output proxy is configured for receiving an output of the heterogeneous functional equivalents, receiving an scheduling policy sent by the second redundant controller, selecting a target heterogeneous functional equivalent according to the scheduling policy and the output of the plurality of heterogeneous functional equivalents, and outputting a service response of the target heterogeneous functional equivalent; and the second redundant controller is configured for receiving a scheduling policy that is from the policy generator or is preset internally, and sending the scheduling policy to the output proxy.

Further, the receiving an output of the plurality of heterogeneous functional equivalents includes: receiving output results and output states of the heterogeneous functional equivalents.

Further, the scheduling policy includes a single-selection scheduling policy or a composite scheduling policy consisted of one single-selection scheduling policy and at least one multi-selection scheduling policy.

Further, the control parameter is used to determine a type of a single-selection scheduling policy or a multi-selection scheduling policy to be executed, and determine the number of heterogeneous functional equivalents selected in the multi-selection scheduling policy.

Moreover, the device further includes: an output proxy, which is connected with the scheduler and the plurality of heterogeneous functional equivalents, and a second redundant controller, which is integrated into the scheduler, wherein:

the output proxy is configured for receiving an output of the plurality of heterogeneous functional equivalents, receiving an scheduling policy sent by the second redundant controller, selecting a target heterogeneous functional equivalent according to the scheduling policy and the output of the plurality of heterogeneous functional equivalents, and outputting a service response of the target heterogeneous functional equivalent; and the second redundant controller is configured for receiving a scheduling policy that is from the policy generator or is preset internally, and sending the scheduling policy to the output proxy.

Further, the receiving an output of the plurality of heterogeneous functional equivalents includes: receiving output results and output states of the plurality of heterogeneous functional equivalents.

A method for scheduling heterogeneous functional equivalents, comprising:

by an input proxy, receiving an external service request, and triggering a first redundant controller according to the external service request;

by the first redundant controller, receiving a triggering signal given by the input proxy, receiving a control parameter that is input externally, and randomly selecting one or more heterogeneous functional equivalents to provide a service to the external service request according to an indication of the control parameter;

feeding, by the first redundant controller, selection information of the heterogeneous functional equivalents back to the input proxy; and by the input proxy, receiving information of the heterogeneous functional equivalents selected by the first redundant controller, and assigning the external service request to the selected heterogeneous functional equivalents.

Further, the method further includes:

by the randomly selected heterogeneous functional equivalents, receiving the external service request assigned by the input proxy, and outputting a service response.

Further, the by the randomly selected heterogeneous functional equivalents, receiving the external service request assigned by the input proxy and outputting a service response includes:

receiving, by an output proxy, an output of the randomly selected heterogeneous functional equivalents;

by a second redundant controller, receiving a scheduling policy that is from external or is preset internally, and sending the scheduling policy to the output proxy;

by the output proxy, receiving the scheduling policy sent by the second redundant controller, and selecting a target heterogeneous functional equivalent according to the scheduling policy and the output of the heterogeneous functional equivalents; and outputting a service response of the target heterogeneous functional equivalent.

The beneficial effects of the invention are as follows:

Under a functionally equivalent condition, an uncertain scheduling policy is introduced by a policy generator between the service function and a plurality of heterogeneous functional equivalents with equivalent functions of the software/hardware device according the solution of the invention, so that the service response provided to the service request has an uncertain correspondence with the feedback results of the heterogeneous functional equivalents of the device. In a structural characterization level of the software/hardware device, it is presented that an uncertainty exists between the service function and the structural characterization of the device. As such, loopholes (defects) or trapdoors (backdoors) parasitized on the heterogeneous functional equivalents may lose static characterization and determinacy thereof due to dynamic fuzzification when being mapped to outside by characterization. Therefore, the effectiveness of reconnaissance or attack directed to unknown loopholes (defects) or trapdoors (backdoors) of the device is lowered greatly, so that the software/hardware device may get an active protective ability in a mechanism level in coping with unknown risks.

BRIEF DESCRIPTION OF THE DRAWINGS

As a part of this application, the drawings are used to provide a further understanding of the invention. The schematic embodiments of the invention and the illustration thereof are used to explain the invention, and are not constituted as limited to the scope of the invention. In the drawings.

DETAILED DESCRIPTION OF THE EMBODIMENTS

To attain objects of the invention, an embodiment of the invention provides a software/hardware device with uncertain service function and structural characterization to solve the problems of the prior art that, remedial measures are taken only when a network space is attacked, thus not defending, in advance, against the unknown risks caused by a design deficiency (loophole) or an embedded trapdoor (backdoor) on the network space architecture.

In order to make one skilled in the art better understand the technical solutions of the invention, the technical solutions of the embodiments of the invention will be described clearly and fully below in conjunction with the drawings in the embodiments of the invention.

Figure 1:
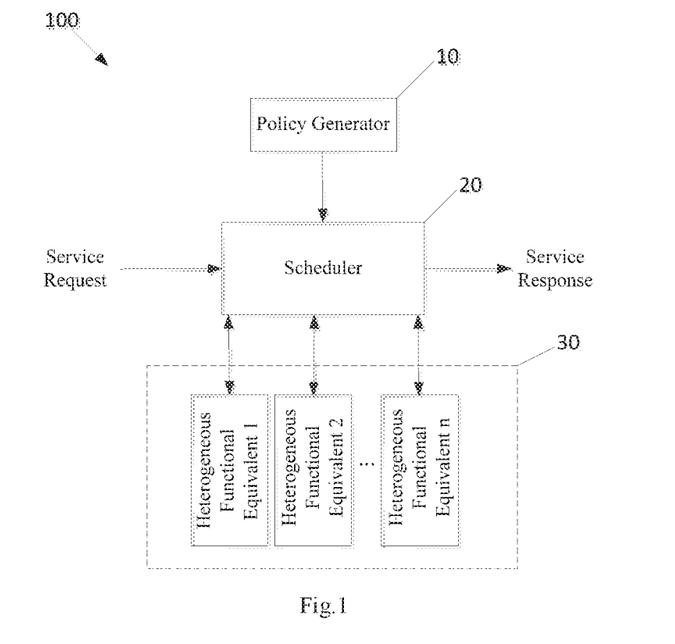
FIG. 1 is a structural diagram of a software/hardware device with uncertain service function and structural characterization according to an embodiment of the invention.

As shown in FIG. 1, a software/hardware device 100 with uncertain service function and structural characterization according to an embodiment of the invention is provided, which includes a policy generator 10, a scheduler 20 and a plurality of heterogeneous functional equivalents 30 with equivalent functions. The scheduler 20 is set between the policy generator 10 and the plurality of heterogeneous functional equivalents 30 with equivalent functions. The scheduler 20 is connected with the policy generator 10, and the scheduler 20 is further connected with the plurality of heterogeneous functional equivalents 30, that is, each heterogeneous functional equivalent is connected with the scheduler.

Wherein, the policy generator 10 is used for providing a scheduling policy for a heterogeneous functional equivalent to the scheduler 20. The scheduling policy may be a scheduling policy for a heterogeneous functional equivalent provided to the scheduler 20 according to a policy preset internally, that is, a policy for selecting a heterogeneous functional equivalent that provides a service to a service request from the plurality of heterogeneous functional equivalents 30 and generating a service response according to a feedback result of the related heterogeneous functional equivalent, for example, a random selection policy employed for assigning heterogeneous functional equivalents, a vote-by-ballot policy or a dynamic weight policy employed for generating the service response, and the like.

Further, in order to make the heterogeneous functional equivalents selected by the scheduler 20 for providing a service thereto have an uncertainty, that is, to make the number of heterogeneous functional equivalents selected for functional representation uncertain and to make the output results of the representation of these heterogeneous functional equivalents uncertain, the policy generator 10 may be a random policy generator or a dynamic policy generator. The random policy generator may randomly generate a scheduling policy via a functional module set internally and provide it to the scheduler 20. In comparison with the random policy generator, the dynamic policy generator does not randomly generate a scheduling policy, but generates a scheduling policy according to a certain rule or according to a certain state of the scheduler. For example, by sequentially arranging several scheduling policies to be selected for execution according to the order of serial numbers 1, 2, 3, 4, . . . , the policy generator 10 provides the scheduling policies to the scheduler 20 in the order of the serial numbers.

As shown in FIG. 1, the scheduler 20 is configured for receiving an external service request, determining, for an external service request, heterogeneous functional equivalents that provide a service to the service request according to the scheduling policy given by the policy generator 10, receiving feedbacks from these heterogeneous functional equivalents, and outputting a service response according to these feedbacks and the scheduling policy given by the policy generator 10. The above service request may be an instruction which is sent to the software/hardware device 100 by a user via a computer. For example, when the software/hardware device 100 accomplishes a routing and addressing function, the service request is the destination IP of a data message; when the software/hardware device 100 accomplishes a data encryption function, the service request is clear data and key.

As shown in FIG. 1, in the above software/hardware device 100, the feedback of the heterogeneous functional equivalents that are selected for providing a service to the service request indicates that these selected heterogeneous functional equivalents perform functional representation internally and output respective functional representation results. These heterogeneous functional equivalents may implement functional representation in a rigid manner such as software, hardware or a combination of software and hardware, etc., or in a flexible manner such as reconstruction, recombination and software customization, etc., wherein, the reconstruction indicates an realization of dynamic assignment and functional translation on all or a part of the logical resources of the software/hardware; the recombination indicates a re-combination or substitution on all or a part of members in a member device; and the software customization indicates that a processing unit and a controlling unit of the heterogeneous functional equivalent are separated, and a user may customize a service function according to an abstract programming interface. Moreover, the heterogeneous functional equivalent may implement functional representation in both the rigid manner and the flexible manner. Additionally, each heterogeneous functional equivalent can singly provide a given service function to the software/hardware device 100. When a selected heterogeneous functional equivalent implements functional representation in a flexible mode, the implemented structure may be modified by the scheduler 20 according to a preset solution automatically or manually, and the modification does not influence the service function of the whole device.

Additionally, the scale of the heterogeneous functional equivalents 30 and their respective implementation mode are not limited, and each heterogeneous functional equivalent includes a system, a subsystem, a module, a function, a middleware and a member, etc.

For the function of providing a service according to a service request, the heterogeneous functional equivalents have equivalence, but each heterogeneous functional equivalent has heterogeneity in the following aspects:

Firstly, critical algorithms are different, wherein the critical algorithms include a flow table rule matching algorithm and a file system page assigning algorithm, etc.;

Secondly, implementation modes are different, for example, data structure, programming language, compile option, software architecture and hardware acceleration mode, etc.; and Thirdly, operating environments are different, for example, a type and version of operating system, a structural environment of hardware system, etc.

The heterogeneity among the heterogeneous functional equivalents includes, but is not limited to, the above three aspects. When the software/hardware device according to this embodiment receives an external service request, because the scheduling policy provided by the policy generator, which is received by the scheduler, is uncertain and states of a plurality of heterogeneous functional equivalents with equivalent functions are different, the heterogeneous functional equivalents for providing a service to the service request, which are determined by the scheduler, are different even if the scheduler receives the same scheduling policy and the same service request, and a manner for these heterogeneous functional equivalents to implement functional representation is also uncertain. Then, the scheduler receives the feedback results from these heterogeneous functional equivalents, therefore, the service response that is output according to these feedback results and the scheduling policy given by the policy generator and the structural characterization also have uncertainty.

Under a functionally equivalent condition, an uncertain scheduling policy is introduced by the policy generator between the service function and the plurality of heterogeneous functional equivalents with equivalent functions of the software/hardware device according to this embodiment, so that the service response provided for the service request has an uncertain correspondence relation with the feedback results of the heterogeneous functional equivalents of the software/hardware device. In a structural characterization level of the software/hardware device, it is presented that an uncertainty exists between the service function and the structural characterization of the software/hardware device. As such, the loopholes (defects) or trapdoors (backdoors) parasitized on the heterogeneous functional equivalents may lose static characterization and determinacy thereof due to dynamic fuzzification when being mapped to outside by characterization. Therefore, the effectiveness of reconnaissance or attack directed to unknown loopholes (defects) or trapdoors (backdoors) of the software/hardware device is lowered greatly, so that the software/hardware device may get an active protective ability in a mechanism level in coping with unknown risks.

In another aspect of this embodiment, the heterogeneous functional equivalents that provide a service to the service request are determined according to the steps below, so that the heterogeneous functional equivalents that are selected for providing a service to the service request can better provide a service to a functional request.

Figure 2:
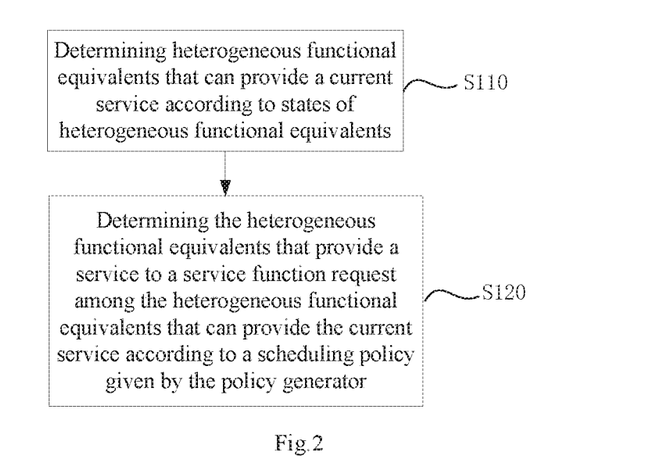
FIG. 2 is a flow chart of a process for determining heterogeneous functional equivalents for a service request according to an embodiment of the invention.

FIG. 2 shows a flow chart of a process in which the software/hardware device determines the heterogeneous functional equivalents for one service request, which includes the specific steps below:

Step S110: the heterogeneous functional equivalents that can provide the current service are determined according to states of the heterogeneous functional equivalents. The states of the heterogeneous functional equivalents may be determined according to an operating state that they previously provide the service, or an information response of these heterogeneous functional equivalents obtained after the scheduler detects the heterogeneous functional equivalents. It may be determined which heterogeneous functional equivalents are in a working state and which heterogeneous functional equivalents are in an idle state, etc., according to the states of the heterogeneous functional equivalents. Additionally, the states of the heterogeneous functional equivalents may also be obtained by a query of the scheduler, or by a report of the heterogeneous functional equivalents, or by a record of the system.

Step S120: the heterogeneous functional equivalents that provide a service to an external service request are determined for the heterogeneous functional equivalents that can provide the current service according to the scheduling policy given by the policy generator. Therefore, all the heterogeneous functional equivalents determined for providing the service to the service request can work normally, and a feedback is provided to the scheduler. This may prevent that the determined heterogeneous functional equivalents cannot provide the service to the current service request and thereby the outputting of a service response by the whole device is influenced because the determined heterogeneous functional equivalents are occupied due to providing a service to the previous service request or are in a working state.

In another embodiment, the policy generator in the above software/hardware device 100 may provide a scheduling policy for the heterogeneous functional equivalent to the scheduler according to a policy preset internally, and may receive a policy parameter provided externally.

Figure 3:
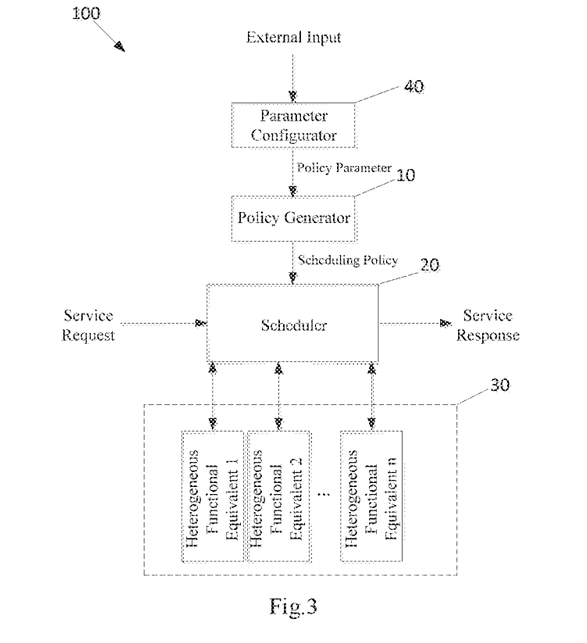
FIG. 3 is a structural diagram of another software/hardware device with uncertain service function and structural characterization according to an embodiment of the invention.

As shown in FIG. 3, the software/hardware device 100 further includes a parameter configurator 40 connected with the policy generator 10, which provides a policy parameter to the policy generator 10 to make the policy generator 10 generate a scheduling policy corresponding to the policy parameter and provide uncertain attributes to the heterogeneous functional equivalents selected for functional representation.

The parameter configurator 40 may provide the policy parameter to the policy generator 10 according to a parameter preset internally, wherein the internally preset indicates that various parameters are preset according to internal functional modules of the policy generator 10 to be selected by a human or a machine. Additionally, the parameter configurator 40 may also provide the policy parameter to the policy generator 10 according to a control parameter input externally, wherein the control parameter input externally indicates a system parameter that can embody the uncertainty of the operating environment of the software/hardware device, which includes, for example, a dynamic random parameter such as system clock, the number of active processes, storage occupancy and processor occupancy, etc., and a state parameter of a plurality of heterogeneous functional equivalents with equivalent service functions, which includes, for example, use frequency, accuracy, and cleaning frequency, etc., of the heterogeneous functional equivalents.

Figure 4:
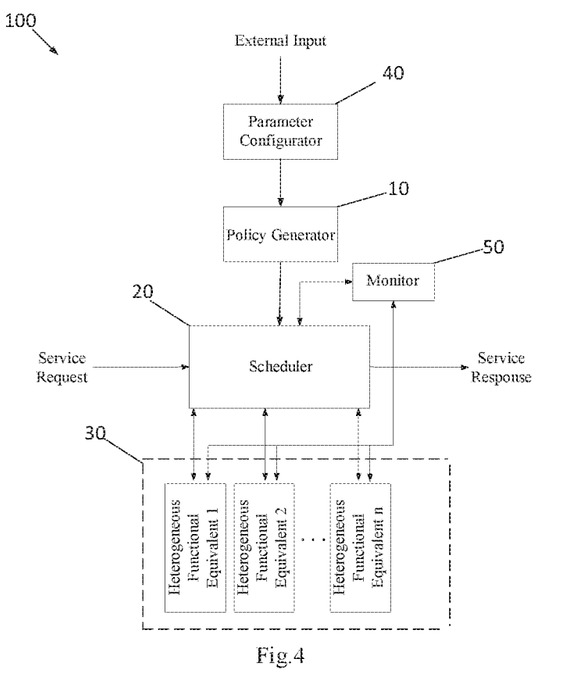
FIG. 4 is a structural diagram of another software/hardware device with uncertain service function and structural characterization according to an embodiment of the invention.

In another embodiment of the invention, as shown in FIG. 4, in order to enhance the security of the software/hardware device 100, the device further includes a monitor 50 (which is also referred as "watchdog"), which is connected with the scheduler 20 and the plurality of heterogeneous functional equivalents 30 with equivalent functions, to monitor the working states of the scheduler 20 and the plurality of heterogeneous functional equivalents 30, and send an alarm or an operational instruction according to the monitored situation. For example, when detecting that the scheduler 20 works abnormally, the monitor 50 sends a reboot operation instruction to the scheduler 20; or, when the plurality of heterogeneous functional equivalents 30 do not respond/ work to the service request or the instruction, the monitor 50 sends a reboot instruction to the abnormal heterogeneous functional equivalents that do not respond or work, and at the same time, sends an alarm signal correspondingly, so that the scheduler 20 controls the abnormal heterogeneous functional equivalents to reboot and output a feedback result, thus the outputting of a service response by the whole device may not be influenced.

Additionally, the monitor 50 is further connected with the policy generator 10 and the parameter configurator 40 to monitor working states of the policy generator 10 and the parameter configurator 40 and send an alarm or an operational instruction according to the monitored situation. The specific monitoring function is the same as the above manner of monitoring the scheduler 20 and the heterogeneous functional equivalents 30 in the software/hardware device 100.

In another embodiment of the invention, the software/ hardware device supports iterative application, that is, the same method as the software/hardware device 100 in the above embodiment may be employed for a plurality of heterogeneous functional equivalents with equivalent functions and their internal service sub-functional units of any one level, as well as the scheduler 20 and its internal service sub-functional units of any one level, so that the uncertainty between the service function and the structural characterization of the software/hardware device may be enhanced.

Figure 5:
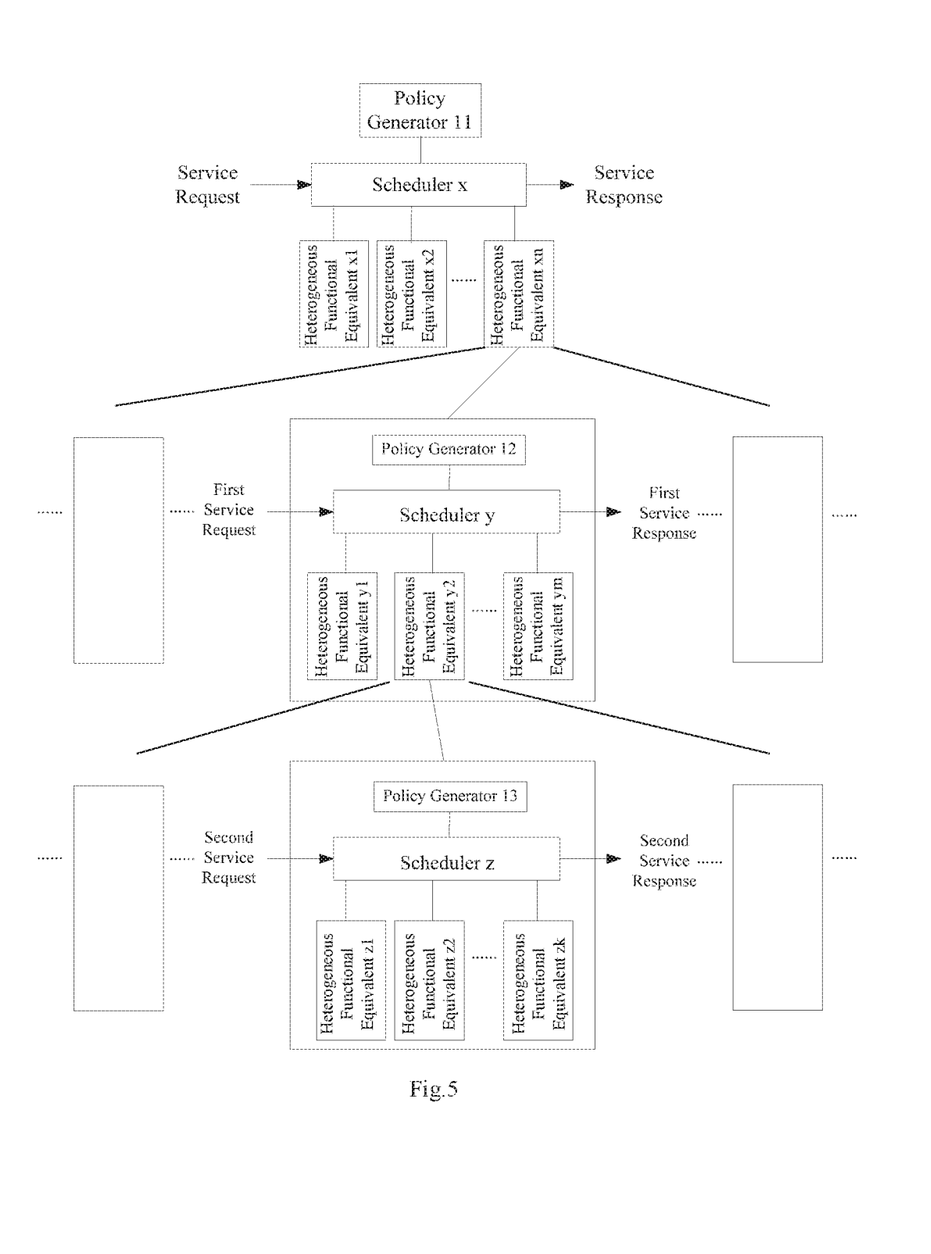
FIG. 5 is a schematic diagram showing the iterative application of a software/hardware device with uncertain service function and structural characterization according to an embodiment of the invention.

A process of the specific iterative application is as shown in FIG. 5. A first level of the device 100 includes a policy generator 11, a scheduler x and n heterogeneous functional equivalents with equivalent functions (with serial numbers of x1, x2, . . . , xn), wherein each heterogeneous functional equivalent x1, x2, . . . , xn may also be further functionally decomposed, and a certain service sub-function may employ the same method as the device 100. For example, one heterogeneous functional equivalent xn of the first level may be decomposed into a second level that is consisted of a policy generator 12, a scheduler y and m heterogeneous functional equivalents with equivalent functions (with serial numbers of y1, y2, . . . , ym), and the scheduler y is connected with the policy generator 11 and the plurality of heterogeneous functional equivalents (y1, y2, . . . , ym). Moreover, the function of the policy generator 12 is the same as that of the policy generator 11 of the first level, the function of the scheduler y is also the same as that of the scheduler x, and the representation form of the plurality of heterogeneous functional equivalents (y1, y2, . . . , ym) and the presentation manner for providing a service to the first service request are also the same as the presentation manner of the plurality of heterogeneous functional equivalents (x1, x2, . . . , xn) of the first level.

Further, based on the second level, the heterogeneous functional equivalent y2 may also be further functionally decomposed, and a certain service sub-function also employs the same method as the device. The heterogeneous functional equivalent y2 includes a third level consisted of a policy generator 13, a scheduler z and k heterogeneous functional equivalents (with serial numbers of z1, z2, . . . , zk), and the connection relations and functions of these components are both the same as those of the first level or the second level of the software/hardware device. The software/hardware device is decomposed into three layers of iteration relation by the above functional decomposition, and it may also be decomposed continuously into the fourth layer, the fifth layer, etc. Generally, in the software level, the last layer of iteration is a computer binary digit, but the iteration ability of the software/hardware device in this embodiment depends on a decomposition granularity and a size of the heterogeneous space of the given service function.

Additionally, in the functional decomposition of each level (the first level, the second level and the third level), each level may also include a scheduler, a parameter configurator and a monitor that have the same structure and function as the above device 100.

In FIG. 5, the scheduler x also supports the iterative application. That is, the functional decomposition may also be performed on the scheduler x, i.e., the scheduler and its internal service sub-functional units of any one level may also be decomposed into a sub-device having a sub-policy generator, a sub-scheduler and a plurality of sub-heterogeneous functional equivalents. Moreover, the connection relations and functions of these decomposed subcomponents are both the same as those of the device 100, and a sub-service response may also be output according to a sub-service request, so that the uncertainty between the service function and the structural characterization of the whole device may be enhanced.

In comparison with the existing passive protection technology based on precise perception, the technology according to the embodiments of the invention introduces an uncertain attribute between the service function and the heterogeneous functional equivalents of the software/hardware device. The uncertain attribute includes uncertainty of the scheduling policy provided to the scheduler by the policy generator, uncertainty of the heterogeneous functional equivalents determined by the scheduler for providing a service to the service request, and uncertainty of the feedback result of these heterogeneous functional equivalents received by the scheduler and uncertainty of the service response and the structural characterization of the device selected to be output according to these feedback results and the scheduling policy given by the policy generator. As such, the loopholes (defects) or trapdoors (backdoors) parasitized on the heterogeneous functional equivalents may lose static characterization and determinacy thereof due to dynamic fuzzification when being mapped to outside by characterization. Therefore, the effectiveness of reconnaissance or attack directed to unknown loopholes (defects) or trapdoors (backdoors) of the device is lowered greatly, so that the software/hardware device may get an active protective ability in the mechanism level in coping with unknown risks.

Figure 6:
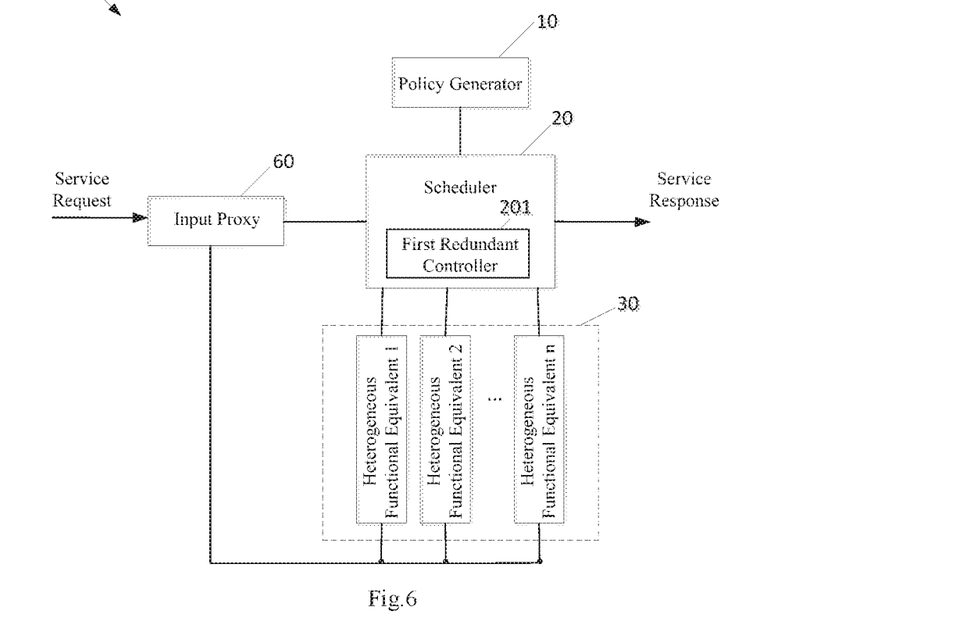
FIG. 6 is a schematic diagram showing the iterative application of another software/hardware device with uncertain service function and structural characterization according to an embodiment of the invention.

In one preferred embodiment, as shown in FIG. 6, the software/hardware device 100 further includes an input proxy 60, which is connected with the scheduler 20 and the heterogeneous functional equivalents 30, and a first redundant controller 201, which is integrated in the scheduler.

The input proxy 60 is connected with the first redundant controller 201 and the plurality of heterogeneous functional equivalents 30, respectively. The input proxy 60 is configured for receiving an external service request, triggering the first redundant controller 201 using the external service request, receiving information of the heterogeneous functional equivalents selected by the first redundant controller 201, and assigning the external service request to these heterogeneous functional equivalents.

Wherein, the input proxy 60 receives the external service request, and the input proxy has any form of service request assignment manners. The external service request may be given by an external apparatus or be given manually, for example, a memory access, a routing calculation and a web request, etc.

The first redundant controller 201 is configured for receiving a triggering signal sent by the input proxy 60, receiving a first control parameter input externally, or receiving a scheduling policy sent by the policy generator, randomly selecting heterogeneous functional equivalents to provide a service to the external service request according to an indication of the first control parameter, and feeding selection information for the heterogeneous functional equivalents back to the input proxy 60.

The first control parameter includes the scheduling policy output by the policy generator, or a control parameter output by the parameter configurator. Moreover, the scheduler receives a second control parameter from outside, and the scheduler sends the second control parameter to the first redundant controller.

Additionally, the first redundant controller 201 is further configured for sending a reboot instruction to an abnormal heterogeneous functional equivalent, or performing operations such as tactical cleaning or resetting, etc., on the heterogeneous functional equivalent. The tactical cleaning includes a buffer memory cleaning and a configuration file cleaning, etc. The resetting refers to performing an initialization setting on the heterogeneous functional equivalent.

Additionally, the first redundant controller 201 implements service management on the heterogeneous functional equivalents by the input proxy 60, which includes controlling the input proxy 60 to assign a service request to the heterogeneous functional equivalents 30 and selecting service output and state or data synchronization among the heterogeneous functional equivalents, etc.

In this embodiment, the input proxy and the first redundant controller are added. When receiving a triggering signal given by the input proxy, the redundant controller randomly selects heterogeneous functional equivalents to provide a service to the external service request according to a received control parameter that is input externally. Therefore, in such a method of randomly selecting heterogeneous functional equivalents for combined scheduling, on one hand, the output response of the heterogeneous functional equivalents has different complexity at the structural characterization level, different heterogeneous functional equivalents are selected for each service request, and different results of heterogeneous functional equivalents are output according to different scheduling policies, which outward exhibits a dynamic and variable output state, thereby it will be very difficult for the attacking party to detect or utilize a backdoor or a loophole (defect) loaded in the network space due to losing static characterization and determinacy.

On the other hand, in the case that a plurality of unknown loopholes (defects) exist on the heterogeneous functional equivalents, so long as these unknown loopholes (defects) are not on the same position of all the heterogeneous functional equivalents and are not breached by the attacker simultaneously, the device may have a defending ability to a plurality of unknown security loopholes (defects) that may exist in a network system, that is, it is hard for the attacker to breach the loopholes (defects) on all the heterogeneous functional equivalents simultaneously.

Additionally, by randomly combined scheduling of the heterogeneous functional equivalents, the structural characterization of a heterogeneous functional equivalent scheduling device appears uncertainty, thereby the abnormal operating status of the heterogeneous functional equivalents is well concealed or obscured, and the predictability of the protective behaviors of the device is lowered greatly.

Further, in another embodiment, the first redundant controller 201 receives a control parameter that is input externally after receiving a triggering signal given by the input proxy 60, and the control parameter includes the number of heterogeneous functional equivalents that may be selected or a seed for generating random numbers. The above redundant controller may execute the control parameter input externally, and may also execute a control parameter generated internally, wherein the external or internal control parameter includes, but is not limited to, the number of active processes, storage occupancy and processor occupancy, etc.

The seed for generating random numbers indicates that an external parameter of a random function is initialized to generate random numbers having a better random effect. The generated random numbers may be used for determining the number of selected heterogeneous functional equivalents and the serial numbers of the selected heterogeneous functional equivalents.

The first redundant controller 201 may select a control parameter input externally according to its internal use condition. When the control parameter input externally is large, that is, when the number of heterogeneous functional equivalents to be scheduled by the first redundant controller 201 is large, the energy consumption of the device may be increased and the burden on the first redundant controller 201 and the input proxy 60 in the device may be increased; however, when an external service request is served by a large number of target heterogeneous functional equivalents, the complexity of external structural characterization of the device may be higher, and the ability to resist the attack from a network invader may be stronger. On the contrary, if a control parameter input externally is small, the number of heterogeneous functional equivalents scheduled by the first redundant controller 20 in the device is small, and the energy consumption of the device deceases; however, because the number of heterogeneous functional equivalents that serve the external service request is small, when some heterogeneous functional equivalents cannot output a response, the device tends to be invaded by a network attacker.

Further, the step in which the first redundant controller 201 randomly selects heterogeneous functional equivalents 30 includes:

Step S1: one heterogeneous functional equivalent is determined according to a first predetermined mode when the selected number is 1;

In the first predetermined mode, the redundant controller may randomly specify one heterogeneous functional equivalent or fixedly specify one heterogeneous functional equivalent according to a policy parameter input externally.

Step S2: n heterogeneous functional equivalents are determined according to a second predetermined mode when the selected number is n;

Wherein, n is less than or equal to the number m of heterogeneous functional equivalents provided by the scheduling device, that is, n≤m.

In the above embodiment in which the heterogeneous functional equivalents are randomly selected, the second predetermined mode includes an odd number-even number mode, a sequential mode or a random mode.

The second predetermined mode may be preset by an internal functional module of the redundant controller, or may be set by an external functional module, for example, the parameter configurator.

In the odd number-even number mode, the m heterogeneous functional equivalents provided in the system are numbered sequentially in an order of 1, 2, 3, . . . , m, and then n heterogeneous functional equivalents with odd serial numbers are selected, for example, heterogeneous functional equivalents labeled as 1, 3, 5, 7, . . . ; or, n heterogeneous functional equivalents with even serial numbers are selected, for example, heterogeneous functional equivalents labeled as 2, 4, 6, 8, . . . .

In the sequential mode, n heterogeneous functional equivalents are selected from m heterogeneous functional equivalents according to a certain order. For example, all the heterogeneous functional equivalents are numbered sequentially in an order of 1 to m, and during selection, the heterogeneous functional equivalents may be selected in a positive sequence from 1 to m, or in a reverse sequence from m to 1.

In random mode, n heterogeneous functional equivalents are randomly selected from m heterogeneous functional equivalents. Countless methods may be employed to randomly select n heterogeneous functional equivalents from m heterogeneous functional equivalents. One or two methods for randomly selecting n heterogeneous functional equivalents will be listed below, without limitation.

Further, when a heterogeneous functional equivalent that cannot provide a service to the external service request exists in one or more heterogeneous functional equivalents selected by the redundant controller, the redundant controller will again randomly select a new heterogeneous functional equivalent for providing a service to the external service request.

For example, when one heterogeneous functional equivalent in the selected n heterogeneous functional equivalents cannot provide a service to the external service request, the first redundant controller 201 randomly selects one heterogeneous functional equivalent from the remaining m-n heterogeneous functional equivalents to replace the heterogeneous functional equivalent that cannot provide the service, and at the same time eliminates the heterogeneous functional equivalent that cannot provide the service, so that the number of selected heterogeneous functional equivalents is n.

Or, n new heterogeneous functional equivalents may also be reselected randomly from the m heterogeneous functional equivalents provided by the system, and the selection mode may be the odd number-even number mode, the sequential mode or the random mode.

Further, when none of the selected heterogeneous functional equivalents can provide a service to the external service request, the first redundant controller 201 randomly reselects new heterogeneous functional equivalents for providing a service to the external service request.

For example, n new heterogeneous functional equivalents may be selected randomly from all the m heterogeneous functional equivalents in the above odd number-even number mode, sequential mode or random mode, so that the reselected heterogeneous functional equivalents can provide a service to the external service request.

In another embodiment of the invention, in order to enhance the security of the above scheduling device, a monitor 50 (which is also referred as "watchdog") in the above device, which is connected with the first redundant controller 201 and the input proxy 60, is configured for monitoring the working states of the first redundant controller 201 and the input proxy 60, and sending an alarm or an operational instruction when an abnormal status occurs.

For example, when the monitor detects that the first redundant controller and the input proxy do not respond/work to a service functional request or instruction or the first redundant controller does not schedule the heterogeneous functional equivalents according to a set scheduling policy, the monitor sends a reboot instruction to the first redundant controller or the input proxy and issues an alarm correspondingly, and at the same time, controls the reboot of the abnormal first redundant controller or input proxy, thus not influencing the outputting of a service response of the device.

Figure 7:
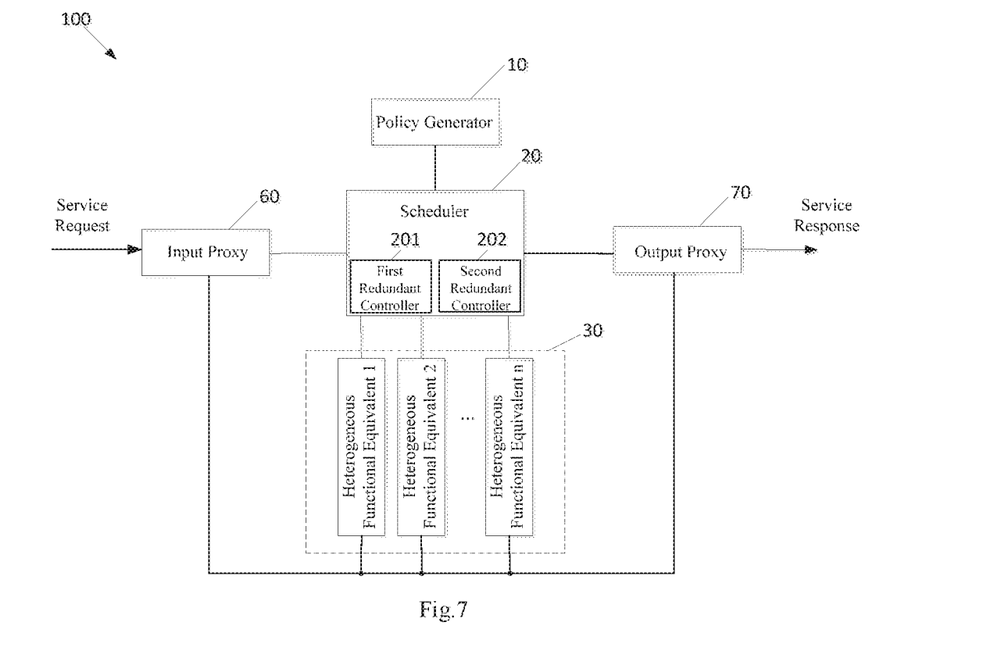
FIG. 7 is a structural diagram of another software/hardware device with uncertain service function and structural characterization according to an embodiment of the invention.

In another preferred embodiment, as shown in FIG. 7, the software/hardware device 100 further includes an output proxy 70, which is connected with the scheduler and the heterogeneous functional equivalents, and a second redundant controller 202, which is integrated into the scheduler.

A plurality of heterogeneous functional equivalents 30 with the same function are respectively connected with the output proxy 70 and the second redundant controller 202. The heterogeneous functional equivalents 30 are configured for providing a service to an external service request. Also, all of the heterogeneous functional equivalents have the same service function, and the scale of each heterogeneous functional equivalent may be a system, subsystem, module, function, middleware and element, etc.

The output proxy 70 is connected with the plurality of heterogeneous functional equivalents 30 to receive an output of the plurality of heterogeneous functional equivalents 30, and it is connected with the second redundant controller 202 to receive a scheduling policy issued by the second redundant controller 202. Also, the output proxy 70 selects a target heterogeneous functional equivalent according to the scheduling policy and the output of the heterogeneous functional equivalents, and outputs the service response of the target heterogeneous functional equivalent.

The second redundant controller 202 is connected with the plurality of heterogeneous functional equivalents 30 to obtain the operating situation of the heterogeneous functional equivalents, for example, the working condition of each heterogeneous functional equivalent. The second redundant controller 202 is connected with the output proxy 70 to achieve information interconnection with the output proxy. Additionally, the output proxy 70 receives the scheduling policy issued by the second redundant controller, selects a target heterogeneous functional equivalent according to the scheduling policy and the output of the heterogeneous functional equivalents, and outputs a service response of the target heterogeneous functional equivalent. If the scheduling policy is different from a scheduling policy executed by the output proxy currently, the scheduling policy is sent to the output proxy 70, or a triggering signal is sent to the second redundant controller 202 after the output proxy 70 receives the output of the plurality of heterogeneous functional equivalents 30. After receiving the triggering signal, the second redundant controller 202 generates a scheduling policy according to an external or internal control parameter and sends the scheduling policy to the output proxy 70.

Wherein, the first redundant controller is connected with the second redundant controller, and they can both receive the scheduling policy generated by the policy generator and the external control parameter. Additionally, the first redundant controller and the second redundant controller may also be integrated into one module, which is referred to as a redundant controller, or a scheduler with the function of a redundant controller.

In the device for outputting a service response of a heterogeneous functional equivalent according to the invention, because the second redundant controller provides different scheduling policies to the output proxy, after the output proxy receives the output of the heterogeneous functional equivalents, a service response, which is selected to be output outward according to the scheduling policy given by second redundant controller and the output of the heterogeneous functional equivalents, is uncertain. As a result, the service response output outward by the device has an uncertain correspondence relation with the heterogeneous functional equivalents of the device, so that internal or external unknown defective backdoors of the device are difficult to be detected, thereby the success ratio of the attacks on the network system by the invader is lowered. As a result, the device may get an active defending ability in coping with unknown risks.

Wherein, the first redundant controller and the second redundant controller are both integrated into the scheduler, and obtain an external parameter by the policy generator to generate a scheduling policy and select a heterogeneous functional equivalent to output a service response.

The receiving the output of the heterogeneous functional equivalents by the above output proxy includes receiving the output results and the output states of these heterogeneous functional equivalents. The output states refers to the states exhibited by the heterogeneous functional equivalents after outputting a service response, which include busy state, idle state and abnormal state, etc.

Further, in order to have more uncertainty between the service response output by the output proxy and the heterogeneous functional equivalents, the scheduling policy further includes a single-selection scheduling policy, or a composite scheduling policy consisted of one single-selection scheduling policy and at least one multi-selection scheduling policy.

The single-selection scheduling policy refers to selecting one heterogeneous functional equivalent from two or more heterogeneous functional equivalents as the target heterogeneous functional equivalent. The selecting refers to selecting the serial number of each heterogeneous functional equivalent or the sequence number representing each heterogeneous functional equivalent, wherein the serial number or sequence number may be an order preset by the device.

The output result of the target heterogeneous functional equivalent is taken as the output result of the device, and a service response is output outward. The above selecting one heterogeneous functional equivalent in the single-selection scheduling policy may be randomly selecting one heterogeneous functional equivalent or selecting one heterogeneous functional equivalent according to a set rule, for example, in the order of the preset serial number of each heterogeneous functional equivalent.

The multi-selection scheduling policy refers to selecting at least two heterogeneous functional equivalents from two or more heterogeneous functional equivalents. The selecting refers to selecting the serial number of each heterogeneous functional equivalent or the sequence number representing each heterogeneous functional equivalent, wherein the serial number or sequence number may be an order preset by the device. If two heterogeneous functional equivalents are selected in the multi-selection scheduling policy, the number of heterogeneous functional equivalents for selection should be greater than two. The above selecting heterogeneous functional equivalents in the multi-selection scheduling policy may be randomly selecting the heterogeneous functional equivalents, or selecting the heterogeneous functional equivalents according to a set rule, for example, selecting heterogeneous functional equivalents according to an odd number rule or an even number rule after numbering all the heterogeneous functional equivalents.

In another aspect of this embodiment, the second redundant controller generates a scheduling policy according to a control parameter that is given externally or preset internally, wherein the control parameter is used for determining the type of the single-selection scheduling policy or the multi-selection scheduling policy that needs to be executed, and determining the number of heterogeneous functional equivalents selected in the multi-selection scheduling policy or other parameters required for executing the single-selection scheduling policy and the multi-selection scheduling policy, for example, a random number seed.

The above control policy parameter may be given by an external device, or preset internally by the redundant controller. For example, the control parameter specifies that a composite scheduling policy to be generated includes a random single-selection policy, a random multi-selection policy and a weight multi-selection policy, for example, the number of heterogeneous functional equivalents, which are selected according to the control parameter in the random multi-selection policy and the weight multi-selection policy, may be set as x and y, respectively. The control parameter may also include a random number seed for the random single-selection policy and the random multi-selection policy.

When the second redundant controller 202 generates a single-selection scheduling policy according to the control parameter, the second redundant controller 202 sends the single-selection scheduling policy to the output proxy 70. The output proxy 70 receives the single-selection scheduling policy and executes the single-selection scheduling policy. That is, one heterogeneous functional equivalent is selected from a plurality of heterogeneous functional equivalents, and an output result of the heterogeneous functional equivalent is taken as an output result of the device for providing a service response to an external service request.

When a composite scheduling policy which is generated by the second redundant controller 202 according to the control parameter includes one multi-selection scheduling policy and one single-selection scheduling policy, the output proxy 70 receives the composite scheduling policy given by the second redundant controller 202. Firstly, the proxy 70 executes the multi-selection scheduling policy, that is, selects m heterogeneous functional equivalents from n heterogeneous functional equivalents, where 2≤m≤n. Next, the proxy 70 executes the single-selection scheduling policy in a plurality of heterogeneous functional equivalents selected in the multi-selection scheduling policy, that is, selects one heterogeneous functional equivalent from the heterogeneous functional equivalents in the multi-selection scheduling policy as a target heterogeneous functional equivalent, and selects an output result of the target heterogeneous functional equivalent to output a service response outward.

When the composite scheduling policy which is generated by the redundant controller according to the control parameter includes two or more multi-selection scheduling policies and one single-selection scheduling policy, the steps for selecting the target heterogeneous functional equivalent includes:

Assumed there are N multi-selection scheduling policies, wherein N is greater than 2, the redundant controller sequentially arranges the N multi-selection scheduling policies according to the control parameter. The N multi-selection scheduling policies are sequentially arranged, in an order from large to small of the number of heterogeneous functional equivalents selected by each multi-selection scheduling policy according to the control parameter, as a first scheduling policy, a second scheduling policy and the like until the last multi-selection scheduling policy is a $N^{th}$ scheduling policy, and the total number of the multi-selection scheduling policies is N.

When the target heterogeneous functional equivalent is selected, according to the scheduling policy sent by the redundant controller, the output proxy first executes the above first scheduling policy, and then executes the second scheduling policy in the heterogeneous functional equivalents selected in the first scheduling policy, and so on. After executing the $N^{th}$ scheduling policy, the output proxy executes the single-selection scheduling policy in the heterogeneous functional equivalents selected in the $N^{th}$ scheduling policy. Finally, the output proxy selects one heterogeneous functional equivalent as the target heterogeneous functional equivalent and outputs the output result of the target heterogeneous functional equivalent.

In another embodiment of the invention, in order to enhance the security of the above scheduling device, the monitor 50 in the above software/hardware device is further connected with the second redundant controller 202 and the output proxy 70 to monitor the working states of the second redundant controller 202 and the output proxy 70, send an alarm of a redundant controller or a heterogeneous functional equivalent in an abnormal status, and control a reboot of the redundant controller or the heterogeneous functional equivalent in the abnormal status.

In another embodiment, the software/hardware device further includes an output proxy, which is connected with the scheduler and the heterogeneous functional equivalent, and a second redundant controller, which is integrated into the scheduler, wherein, the output proxy and the second redundant controller respectively have the same structure and function as the output proxy 70 and the second redundant controller 202 in the above embodiment, thus detailed description thereof will be omitted.

Figure 8:
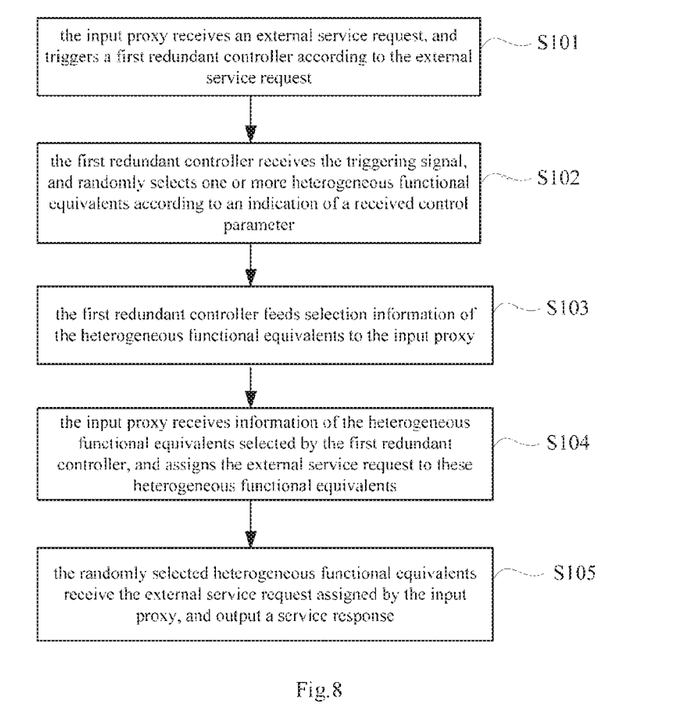
FIG. 8 is a flow chart of a method for scheduling a heterogeneous functional equivalent according to an embodiment of the invention.

Corresponding to the above software/hardware device, the invention further provides a method for scheduling a heterogeneous functional equivalent, which is applied to the software/hardware device. As shown in FIG. 7, the method includes:

Step S101: an input proxy receives an external service request, and triggers a first redundant controller according to the external service request; the input proxy sends a triggering signal to the redundant controller according to the external service request when receiving the information of the external service request, wherein the triggering signal may be issued by a signal generator.

Step S102: the first redundant controller receives the triggering signal given by the input proxy and a control parameter input externally, and randomly selects one or more heterogeneous functional equivalents to provide a service to the external service request, according to an indication of the external control parameter.

Step S103: the first redundant controller feeds selection information of the heterogeneous functional equivalents selected randomly to the input proxy;

Step S104: the input proxy receives the information of the heterogeneous functional equivalents selected by the first redundant controller, and assigns the external service request to these selected heterogeneous functional equivalents.

In another aspect of the embodiment of the invention, the above method further includes:

Step S105: the randomly selected heterogeneous functional equivalents, receive the external service request assigned by the above input proxy, and output a service response.

In the method, the first redundant controller may also be replaced by a scheduler in the software/hardware device, or the first redundant controller and the scheduler may be united as a scheduler that has the function of the first redundant controller.

In the method for scheduling a heterogeneous functional equivalent according to the embodiment of the invention, when the redundant controller receives a triggering signal given by an input proxy and randomly selects a heterogeneous functional equivalent to provide a service to the external service request according to a received control parameter input externally, the structural characterization of the scheduling device exhibits uncertainty by randomly combined scheduling of the heterogeneous functional equivalents, that is, the number of heterogeneous functional equivalents for providing a service to the external service request is uncertain, and it is uncertain that which heterogeneous functional equivalents provide a service to the external service request. On one hand, this uncertainty makes the output response of the heterogeneous functional equivalents have different complexity at the structural characterization level, thus different heterogeneous functional equivalents are selected for each service request, and different results of heterogeneous functional equivalents are output according to different scheduling policies, which outward exhibits a dynamic and variable output state, thereby it is very difficult for the attacking party to detect or utilize the trapdoor (backdoor) or loophole (defect) loaded on the network space due to losing static characterization and determinacy.

In comparison with a traditional isomorphic redundant control, for the method for scheduling a heterogeneous functional equivalent provided in this solution, a novel method (e.g. the randomly combined scheduling method) for improving the complexity of the external structural characterization of a heterogeneous object is introduced based on the first redundant controller (or scheduler), so that the device not only exceeds the reliability of the isomorphic redundant at the mechanism level, but also has an ability and adjustable means of actively protecting against unknown safety risks.

Figure 9:
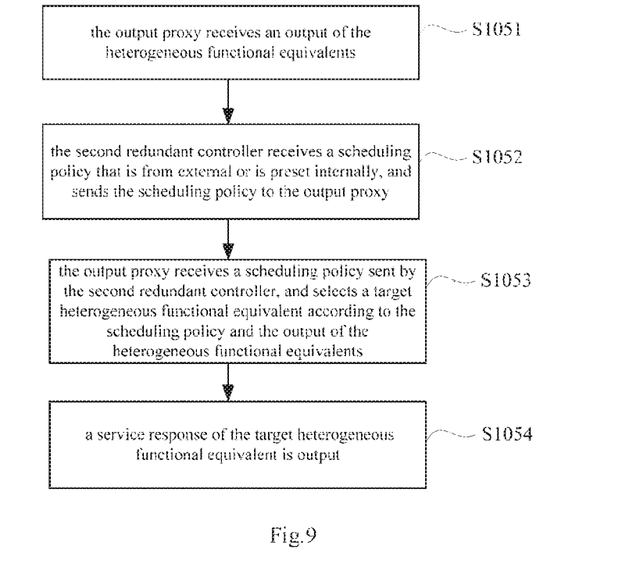
FIG. 9 is a flow chart of a method for outputting a service response of a heterogeneous functional equivalent according to an embodiment of the invention.

In another embodiment of the method, as shown in FIG. 9, a method for a heterogeneous functional equivalent to output a service response is further provided in conjunction with the output proxy, wherein the above Step S105 specifically includes:

Step S1051: an output proxy receives an output of heterogeneous functional equivalents, wherein the output includes output results and output states of the heterogeneous functional equivalents.

Step S1052: a second redundant controller receives a scheduling policy that is form external or is preset internally, and sends the scheduling policy to the output proxy. Wherein, the external scheduling policy includes a scheduling policy from a parameter configurator; the scheduling policy preset internally refers to a scheduling policy generated by the scheduler or the first redundant controller or the second redundant controller according to a preset algorithm and program, etc. . . . . The scheduling policy includes a single-selection scheduling policy or a composite scheduling policy.

Step S1053: the output proxy receives a scheduling policy issued by the second redundant controller, and selects a target heterogeneous functional equivalent according to the scheduling policy and the output of the heterogeneous functional equivalents.

By executing the scheduling policy from the second redundant controller, the output proxy finally selects one heterogeneous functional equivalent as the target heterogeneous functional equivalent.

Additionally, the output proxy may passively obtain the scheduling policy given by the second redundant controller. For example, the second redundant controller sends a scheduling policy to the output proxy every once in a time interval, or, the output proxy issues a triggering signal to the second redundant controller after receiving the output of the heterogeneous functional equivalents, and the second redundant controller sends a scheduling policy to the output proxy after receives the triggering signal.

Step S1054: after determining the target heterogeneous functional equivalent in step S1053, a service response of the target heterogeneous functional equivalent is output, and the output result of the target heterogeneous functional equivalent is output to provide a service response to the external service request.

In the method for outputting a service response of a heterogeneous functional equivalent, because the second redundant controller provides different scheduling policies to the output proxy, after the output proxy receives the output of the heterogeneous functional equivalents, the target heterogeneous functional equivalent selected according to the scheduling policy given by the redundant controller and the output of the heterogeneous functional equivalents is uncertain, thereby the output result of the target heterogeneous functional equivalent is uncertain, and the service response selected for outputting outward is uncertain. Thus, the service response output outward by the device has an uncertain correspondence relation with the heterogeneous functional equivalents of the device, so that internal or external unknown defective backdoors of the device are difficult to be detected. As a result, the success ratio of the attacks on the network system by the invaders is lowered, and the device gets an active defending ability in coping with unknown risks.

Additionally, when the device outputs a service response, because the heterogeneous functional equivalent selected for outputting according to the scheduling policy and the output of the heterogeneous functional equivalents is uncertain, when an abnormal heterogeneous functional equivalent exists, the abnormal heterogeneous functional equivalent can be replaced with other normal heterogeneous functional equivalents to output a service response. This obscures the operating status of the abnormal heterogeneous functional equivalent at the structural characterization level, so that it will be difficult for an invader to identify the abnormal heterogeneous functional equivalent, thereby the defending ability of the device can be improved.

The above description shows the core concept of the invention. In order to make one skilled in the art better understand the solutions of the invention, the technical solutions of the embodiments of the invention will be described below clearly and fully in conjunction with the drawings in the embodiments of the invention. Apparently, the embodiments described are only a part of the embodiments of the invention, rather than all of embodiments. Other embodiments, which are obtained by one of ordinary skills in the art based on the embodiments in the invention without creative work, pertain to the protection scope of the invention.

What is claimed is:

1. A device with uncertain service function and structural characterization, comprising a policy generator, a scheduler and a plurality of heterogeneous functional equivalents with equivalent functions, the scheduler being set between the policy generator and the plurality of heterogeneous functional equivalents, wherein:

the policy generator provides a scheduling policy for the plurality of heterogeneous functional equivalents to the scheduler;

the scheduler receives an external service request, determines heterogeneous functional equivalents that provide a service to the external service request according to the scheduling policy given by the policy generator, assigns the external service request to the determined heterogeneous functional equivalents, receives a feedback from the determined heterogeneous functional equivalents, and outputs a service response which has an uncertain relation with structural characterization according to the feedback and the scheduling policy given by the policy generator, and wherein either the policy generator or the scheduler is a hardware device.

2. The device according to claim 1, wherein, the determining heterogeneous functional equivalents that provide a service to the external service request includes:

determining heterogeneous functional equivalents that are capable of providing a current service according to states of the plurality of heterogeneous functional equivalents; and determining heterogeneous functional equivalents that provide a service to the external service request among the heterogeneous functional equivalents that are capable of providing the current service, according to the scheduling policy given by the policy generator.

3. The device according to claim 2, wherein, the policy generator is a random policy generator or a dynamic policy generator.

4. The device according to claim 3, further comprising: a parameter configurator, which is connected with the policy generator, and configured for providing a policy parameter to the policy generator so as to make the policy generator generate a scheduling policy corresponding to the policy parameter.

5. The device according to claim 4, further comprising: a monitor, which is connected with the scheduler and the plurality of heterogeneous functional equivalents, and configured for monitoring working states of the scheduler and the plurality of heterogeneous functional equivalents and sending an alarm or an operational instruction according to a monitored situation.

6. The device according to claim 5, wherein, the heterogeneous functional equivalents and internal service sub-functional units of any one level thereof employ a solution of the software/hardware device with uncertain service function and structural characterization.

7. The device according to claim 6, wherein, the scheduler and internal service sub-functional units of any one level thereof employ a solution of the software/hardware device with uncertain service function and structural characterization.

8. The device according to claim 1, further comprising: an input proxy, which is connected with the scheduler and the plurality of heterogeneous functional equivalents, and a first redundant controller, which is integrated into the scheduler, wherein:
the input proxy is configured for receiving an external service request, triggering the first redundant controller with the external service request, receiving information of heterogeneous functional equivalents selected by the first redundant controller, and assigning the external service request to the selected heterogeneous functional equivalents; and
the first redundant controller is configured for receiving the triggering signal given by the input proxy, receiving a first control parameter input externally, randomly selecting heterogeneous functional equivalents to provide a service to the external service request according to an indication of the first control parameter, and feeding selection information for the heterogeneous functional equivalents back to the input proxy.

9. The device according to claim 8, wherein, the first control parameter comprises: the number of heterogeneous functional equivalents which is capable of being selected, or a seed for generating a random number.

10. The device according to claim 8, further comprising: an output proxy, which is connected with the scheduler and the plurality of heterogeneous functional equivalents, and a second redundant controller, which is integrated into the scheduler, wherein:
the output proxy is configured for receiving an output of the plurality of heterogeneous functional equivalents, receiving an scheduling policy sent by the second redundant controller, selecting a target heterogeneous functional equivalent according to the scheduling policy and the output of the plurality of heterogeneous functional equivalents, and outputting a service response of the target heterogeneous functional equivalent; and the second redundant controller is configured for receiving a scheduling policy that is from the policy generator or is preset internally, and sending the scheduling policy to the output proxy.

11. The device according to claim 10, wherein, the receiving an output of the plurality of heterogeneous functional equivalents comprises: receiving output results and output states of the plurality of heterogeneous functional equivalents.

12. The device according to claim 11, wherein, the scheduling policy comprises a single-selection scheduling policy or a composite scheduling policy consisted of one single-selection scheduling policy and at least one multi-selection scheduling policy.

13. The device according to claim 10, wherein, the control parameter is used to determine a type of a single-selection scheduling policy or multi-selection scheduling policy to be executed, and determine the number of heterogeneous functional equivalents selected in the multi-selection scheduling policy.

14. The device according to claim 1, further comprising: an output proxy, which is connected with the scheduler and the plurality of heterogeneous functional equivalents, and a second redundant controller, which is integrated into the scheduler, wherein:
the output proxy is configured for receiving an output of the plurality of heterogeneous functional equivalents, receiving an scheduling policy sent by the second redundant controller, selecting a target heterogeneous functional equivalent according to the scheduling policy and the output of the plurality of heterogeneous functional equivalents, and outputting a service response of the target heterogeneous functional equivalent; and
the second redundant controller is configured for receiving a scheduling policy that is from the policy generator or is preset internally, and sending the scheduling policy to the output proxy.

15. The device according to claim 14, wherein, the receiving an output of the plurality of heterogeneous functional equivalents comprises: receiving output results and output states of the plurality of heterogeneous functional equivalents.

16. A method for scheduling heterogeneous functional equivalents, comprising:
by an input proxy, receiving an external service request and triggering a first redundant controller according to the external service request;
by the first redundant controller, receiving a triggering signal given by the input proxy, receiving a control parameter that is input externally, and randomly selecting one or more heterogeneous functional equivalents to provide a service to the external service request according to an indication of the control parameter;
feeding, by the first redundant controller, selection information of the heterogeneous functional equivalents back to the input proxy; and
by the input proxy, receiving information of the heterogeneous functional equivalents selected by the first redundant controller, and assigning the external service request to the selected heterogeneous functional equivalents.

17. The method according to claim 16, further comprising:
by the randomly selected heterogeneous functional equivalents, receiving the external service request assigned by the input proxy, and outputting a service response.

18. The method according to claim 17, wherein, the by the randomly selected heterogeneous functional equivalents, receiving the external service request assigned by the input proxy and outputting a service response comprises:
by an output proxy, receiving an output of the randomly selected heterogeneous functional equivalents;
by a second redundant controller, receiving a scheduling policy that is from external or is preset internally, and sending the scheduling policy to the output proxy;
by the output proxy, receiving the scheduling policy sent by the second redundant controller, and selecting a target heterogeneous functional equivalent according to the scheduling policy and the output of the heterogeneous functional equivalents; and outputting a service response of the target heterogeneous functional equivalent.

* * * * *